US012718446B2

(12) United States Patent
Brown et al.

(10) Patent No.: US 12,718,446 B2
(45) Date of Patent: Aug. 25, 2026

(54) DATA REDUCTION IN SPECTRAL CT

(71) Applicants: KONINKLIJKE PHILIPS N.V., Eindhoven (NL); THE TRUSTEES OF THE UNIVERSITY OF PENNSYLVANIA, Philadelphia, PA (US)

(72) Inventors: Kevin Martin Brown, Highland Heights, OH (US); Thomas Koehler, Norderstedt (DE); Michael Grass, Buchholz In der Nordheide (DE); Peter Benjamin Theodor Noel, Unterföhring (DE); Olivia F. Sandvold, Philadelphia, PA (US); Roland Proksa, Neu Wulmstorf (DE)

(73) Assignees: KONINKLIJKE PHILIPS N.V., Eindhoven (NL); THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 177 days.

(21) Appl. No.: 18/581,166

(22) Filed: Feb. 19, 2024

(65) Prior Publication Data

US 2025/0265741 A1 Aug. 21, 2025

(51) Int. Cl.
*G06T 12/20* (2026.01)

(52) U.S. Cl.
CPC ........ *G06T 12/20* (2026.01); *G06T 2211/408* (2013.01)

(58) Field of Classification Search
CPC ................. G06T 11/006; G06T 11/005; G06T 2211/408; A61B 6/032; A61B 6/5205; A61B 6/482
See application file for complete search history.

(56) References Cited

U.S. PATENT DOCUMENTS 7,903,858 B2 * 3/2011 Chang ................ G01R 33/4824 382/280
11,123,026 B2 * 9/2021 Bornefalk ............ A61B 6/5205
(Continued)

FOREIGN PATENT DOCUMENTS

EP 4295776 A1 12/2023

OTHER PUBLICATIONS

Yang Y. et al., "Empirical Optimization of Energy Bin Weights for Compressing Measurements with Realistic Photon Counting X-Ray Detectors", Medical Physics, AIP, Melville, NY, US, vol. 51, No. 1, Jul. 3, 2023 (Jul. 3, 2023), pp. 224-238, XP072564156.
(Continued)

*Primary Examiner* — John B Strege
(74) *Attorney, Agent, or Firm* — Larry Liberchuk

(57) ABSTRACT

The invention provides a method for data reduction in the context of spectral CT imaging. The method comprises reducing the number of spectral channels of the acquired CT data by a reduced set of synthetic energy channels, each from a weighted combination of the original measured energy channel. The weights are selected in an optimization process in which an error metric associated with an output of a material decomposition procedure to be applied to the CT data is estimated, and the weights adjusted to minimize a value of the error metric. The error might for example be a noise estimate, and/or a bias estimate.

12 Claims, 4 Drawing Sheets

(56) References Cited

U.S. PATENT DOCUMENTS

2013/0343624 A1* 12/2013 Thibault ............... G06T 11/006
382/131
2016/0314574 A1* 10/2016 Lee ......................... G06F 16/56

OTHER PUBLICATIONS

Yang Y. et al., "Comparison of Energy Bin Compression Strategies for Photon Counting Detectors", Proceedings of the SPIE, SPIE, US, vol. 12304, Oct. 18, 2022 (Oct. 18, 2022), pp. 123042M-123042M, XP060166617.
Anonymous: "Find global minimum—MATLAB", Mar. 21, 2023 (Mar. 21, 2023), pp. 1-7, XP093271002, Retrieved from the Internet: URL:https://web.archive.org/web/20230321174856/https://www.mathworks.com/help/gads/globalsearch.html.
Zimmerman K. C. et al., "Experimental Comparison of Empirical Material Decomposition Methods for Spectral CT", Physics in Medicine & Biology, vol. 60, No. 8, 2015.
Roessl E. et al., "Cramer-Rao Lower Bound of Basis Image Noise in Multiple-Energy X-Ray Imaging", Physics in Medicine & Biology, vol. 54, No. 5, pp. 1307-1318, 2009.

* cited by examiner

DATA REDUCTION IN SPECTRAL CT

STATEMENT REGARDING FEDERALLY SPONSORED RESEARCH OR DEVELOPMENT

This invention was made with government support under EB030494 awarded by the National Institutes of Health. The government has certain rights in the invention.

FIELD OF THE INVENTION

The present invention provides a method for data reduction in spectral computed tomography (CT) imaging.

BACKGROUND OF THE INVENTION

Multi-Energy or Spectral CT involves the acquisition of multiple (N) spectral channels of CT data, each spanning a different range of x-ray energies, and the subsequent Material Decomposition (MD) onto a set of M material basis functions. This allows for full characterization of the different energy-dependent attenuation curves of various materials present in the body.

The spectral CT data can be obtained either by using an energy discriminating x-ray detector which can detect photons in different energy bins, and/or by using a kVp-switching x-ray tube which emits x-rays at two or more different spectra.

For example, a dual-layer detector can be combined with a kVp-switching x-ray tube (often referred to as "Quad-Energy CT").

For applications excluding k-edge contrast imaging, M=2 is sufficient for an accurate material decomposition. However, there are technical advantages in a configuration in which N>M during data acquisition. In particular, this results in reduced noise in the decomposed images.

However, there are at least two significant problems with performing spectral CT imaging with a setup in which the number of spectral channels (N) is larger than 2. A first problem relates to data storage size and data transfer bandwidths. In a system with N>2, there is a significant increase in the quantity of detection data acquired. This has a significant impact both on data storage requirements (e.g. on physical disks), and data transfer requirements, e.g. from the CT detectors across the gantry slip ring to other parts of the system. This data size problem is particularly impactful for photon-counting detectors, which typically have a significantly greater number of (smaller) detector pixels (to achieve higher resolution) than conventional CT detectors, and as many as five or more energy bins. In state of the art systems, this results in a data increase compared to conventional CT scanners of approximately 14×. The increased requirements for data storage and transfer capacity imposes significant additional cost to the manufacture and operation of the scanner.

A second problem relates to the computational load of running the material decomposition (MD) algorithm. The MD algorithm for multi-energy CT maps the N-dimensional input vector to a two-dimensional output. This problem is overdetermined and must have the capacity to handle noisy input data. Mathematical methods exist for solving this over-determined problem in a statistically optimal sense, e.g., using a maximum likelihood (ML) approach. However, the computational load of these methods is high, resulting in significant hardware requirements for the image reconstruction operations of the system. This adds significantly to the cost of the scanner. A common way of performing material decomposition with reduced computational demand and faster speed is to use pre-calculated lookup-tables (LUTs). These LUTs are a practical solution for a 2×2 (2 spectral channel inputs, 2 material basis outputs) MD, but scale rapidly for systems for which there are more than two input energy channels.

Thus, a method capable of reducing an N×2 material decomposition to a more efficient 2×2 MD problem would be of significant value.

SUMMARY OF THE INVENTION

The invention is defined by the claims.

According to examples in accordance with an aspect of the invention, there is provided a method for data reduction of multi-energy computed tomography projection data.

The method comprises obtaining first projection data comprising data for each of a set of three or more measured energy channels.

The method further comprises transforming the first projection data into second projection data. The second projection data has a reduced number of energy channels. Thus the method may be referred to as channel reduction. The second projection data comprises data for a set of two or more synthetic energy channels, wherein each synthetic energy channel is formed as a weighted combination of the measured energy channels. In some examples, each may be formed of a weighted combination of at least two of the measured energy channels. In some embodiments, collectively, the set of synthetic energy channels includes at least one weighted multiple of each of the measured set of energy channels.

The synthetic energy channels are determined using an optimization procedure aimed at minimizing a quality loss associated with the channel reduction. The optimization process is preferably performed in an upfront (or preliminary) process, before the first projection data is acquired, but on-line or real time optimization is also an option.

The weights of the weighted combinations for each synthetic energy channel are determined in the optimization procedure. The optimization procedure for example comprises estimating a value indicative of or correlated with a predicted measure of error of outputs of a known material decomposition procedure if applied to data binned according to the synthetic energy channels. An optimization may be run wherein the weights are adjusted to minimize this error measure and thereby arrive at optimized weights.

For example, the optimization procedure may comprise minimizing a value of a cost function, wherein a cost output from the cost function is correlated with a predicted measure of error for the outputs of the material decomposition algorithm if applied to data binned according to the candidate set of synthetic energy channels. The optimization procedure may further comprise adjusting the candidate weights iteratively to minimize the cost output and thereby arrive at an optimized set of weights.

The predicted measure of error which is minimized in the optimization procedure may for example comprise at least a component which is correlated with a predicted bias of the output of the material decomposition procedure if applied to data binned according to the candidate set of synthetic energy channels. Additionally or alternatively, the predicted measure of error which is minimized in the optimization procedure may for example comprise at least a component which is correlated with a predicted variance or covariance (i.e. noise) of the outputs of the material decomposition procedure if applied to data binned according to the candidate set of synthetic energy channels.

For example, in one advantageous set of embodiments, the optimization procedure may comprise determining a predicted covariance matrix of outputs of a pre-defined material decomposition algorithm if the algorithm were to be applied to data comprising the candidate synthetic energy channels. For example, the optimization procedure may comprise determining a predicted covariance matrix of outputs of a spectral forward model of a material decomposition algorithm when the output energy channels of the forward model are modified to match the candidate synthetic energy channels. In other words, where the spectral forward model is modified to model expected measurement responses in the set of candidate synthetic energy channels instead of the measured energy channels. The modification may comprise forming a weighted combination of the output energy channel components of the original forward model for example.

By way of example, the optimization procedure may comprise applying an error estimator model configured to receive as input a candidate set of synthetic energy channels formed according to a candidate set of weights, and to generate as output a predicted covariance matrix of outputs of a pre-defined material decomposition algorithm if the algorithm were to be applied to the candidate energy channel data. The optimization procedure may further comprise applying a pre-defined cost function to the covariance matrix, wherein a cost output from the cost function is correlated with a predicted measure of error for the outputs of the material decomposition algorithm. The optimization procedure may further comprise adjusting the candidate weights iteratively to minimize the cost output and thereby arrive at an optimized set of weights.

The invention is thus based on the concept of combining the measured energy channels of measured projection data into a smaller number of reduced energy channels, thereby reducing the quantity of the second (reduced) projection data. The weights used for the combination can be tuned, for example based on information about the material decomposition algorithm, about the acquisition parameters of the imaging system and/or about the target imaging task, to minimize a predicted error (e.g. noise and/or bias) associated with the material decomposition output if applied to the reduced projection data.

By way of illustration, the method may comprise a reduction of the number of spectral channels of acquired multi-energy CT projection data according to the following general scheme:

$$SC_1 = \sum_{i=1:N} W_{1,i} \cdot MC_i$$

$$SC_2 = \sum_{i=1:N} W_{2,i} \cdot MC_i$$

where $MC_i$ are the input measured energy channels, $W_{1,i}$ and $W_{2,i}$ are optimized weights, derived using an optimization procedure (discussed in more detail below), for a given targeted application, and outputs $SC_1$ and $SC_2$ are the reduced (synthetic) energy channels used for the reduced second projection data.

It has been found by the inventors that embodiments of the invention enable significant reduction in the data transmission (slip ring band width) and data storage requirements of multi-energy CT systems, while retaining >90% of the spectral performance of high N (>4) spectral channel systems.

The error estimator model is preferably further configured to output a predicted bias of outputs of the pre-defined material decomposition algorithm if the algorithm were to be applied to the candidate synthetic energy channel data. Thus, estimates of both variance (noise) and bias can be obtained, The cost function may be applied also to the predicted bias and wherein a cost output from the cost function is correlated with a predicted measure of bias of the outputs of the material decomposition algorithm.

In some embodiments, the optimization procedure is performed in advance of obtaining the first projection data.

In some embodiments, the optimization procedure comprises a step of storing the optimized set of weights in a weights database.

In some embodiments, the step of transforming the first projection data into the second projection data comprises accessing the weights database to retrieve the optimized set of weights and using the optimized set of weights to define the two or more synthetic energy channels of the second projection dataset.

In some embodiments, the weights database stores a plurality of pre-determined sets of weights for the three of more measured energy channels, each for defining a respective set of synthetic energy channels. In some embodiments, each set of weights may be derived by applying a respective instance of the optimization procedure.

In some embodiments, the transforming the first projection data into the second projection data comprises accessing the weights database, selecting one of the plurality of sets of weights and using the selected set of weights to define the two or more synthetic energy channels of the second projection dataset.

In some embodiments, each set of weights in the database is optimized for application in a defined imaging scenario, and wherein the selecting from the database is performed based on querying the database with a target imaging scenario to be performed. Additionally or alternatively, results from a scout scan could be processed and used as a parameter for querying the database.

According to a preferred set of embodiments, the determining the covariance matrix comprises applying a Cramer-Rao Lower Bound (CRLB) method. The CRLB is a statistical tool used to estimate the lower bound on the variance of unbiased estimators. In other words, it provides a theoretical minimum variance that any unbiased estimator can achieve for a parameter of interest. In the context of CT material decomposition, the output of the material decomposition algorithm includes quantitative estimates of the (concentrations of) materials present in the scanned volume. These estimates are derived from the CT projection data, which inherently includes noise due to the imaging process. The CRLB offers a way to understand the best possible accuracy (in terms of variance) that can be achieved by an unbiased estimator of the material concentrations based on data represented using a candidate set of synthetic energy channels.

As will be well known to the skilled person, a material decomposition procedure in CT imaging is characterized by a forward model which describes theoretical mappings between material densities or path lengths in the body along a beam path and expected measurements in each detector energy bin at the end of the beam path (e.g. photon counts in each energy bin) given the expected energy-dependent attenuation of the body being imaged (sometimes referred to as an attenuation model). Computing the covariance matrix may comprise applying a CRLB method to the forward model for the material decomposition algorithm, to compute a CRLB of the material densities or material path lengths.

For example, an example forward model of a material decomposition algorithm might take the form:

$$c_i(l) = \int_0^\infty S(E)\exp\left[-\sum_{j=1}^{M} l_j\mu_j(E)\right]dE$$

where this models the expected number of photons, $c_i$, detected in the $i^{th}$ energy bin (channel), $c_i$, of an ideal photon-counting detector, where S(E) is the x-ray source spectrum and $l_j$, the elements of l, are the thicknesses of M basis materials having attenuation coefficients functions, $\mu_j$. The spectral measurements are represented as a vector of detected photon counts, $c=[c_1, c_2, \ldots, c_N]^T$, where N is total the number of energy channels.

Optionally, the forward model can also incorporate one or more error terms, for instance for each energy channel i.

For a given candidate set of synthetic energy channels, the error estimator model may be configured to modify the forward model to reflect a forward model for the new synthetic energy channels and to then compute a CRLB of the covariance matrix for the modified forward model.

For example, for a given synthetic energy channel set $MC_n$, then the modified forward model for the synthetic energy channels can be expressed as:

$$SC_n(l) = \sum_{i=1:N} W_{n,i}c_i(l) = \int_0^\infty\left[\sum_{i=1:N}(W_{n,i}S_i(E))\right]\exp\left[-\sum_{j=1}^{M} l_j\mu_j(E)\right]dE$$

for synthetic energy channel $SC_n$. In other words, it may be formed as a linear combination of the forward model channel outputs, $c_i$, for the measured energy channels, i.

In some embodiments, the covariance matrix estimation may be configured to further take account of other variable parameters of the system, such as a patient attenuation model and/or effective x-ray input spectra.

In other words, in some embodiments, inputs to the CRLB method may further include for example: a patient attenuation model which models expected spectral x-ray attenuation by the patient body. This model may be a generic model or a patient-specific model. A patient specific model may be derived for example from a scout (survey) scan of the patient. The patient attenuation model may in some examples consist of a set of material attenuation coefficients for the patient, $\mu_j(E)$. The input to the CRLB may further include expected effective input spectra, $S_i(E)$, to the material decomposition procedure and optionally an estimated noise distribution for the effective input spectra. The estimating the effective input spectra may comprise receiving an indication of energy thresholds of energy bins of the detector, and an emission spectrum of the x-ray source, and estimating from these a pulse height spectrum response of each of the measured energy bins.

The estimated noise distribution for the effective input energy spectra may in some embodiments be assumed to be Poisson noise distribution. This applies in particular in the case of a photon counting detector.

The patient attenuation model and the effective input spectra may both be incorporated into the CRLB estimation of the covariance matrix by incorporating them in the forward model for the material decomposition algorithm. The forward model includes factors representing expected energy-dependent attenuation coefficients, $\mu_j(E)$, and includes effective input x-ray spectra, S(E).

In some embodiments, the method may further comprise applying the material decomposition algorithm to the second projection data.

In some embodiments, applying the material decomposition algorithm may comprise applying a pre-computed lookup table which is configured to map between measurement values in each of the synthetic energy channels and material values for each of two or more basis materials. For example the lookup table is computed in advance based on computing output measurement values of the forward model for various given theoretical material values. These can then be used in real time to compute backwards from measurement values for corresponding estimates material values. In some embodiments, there may be two synthetic energy channels and two basis materials and wherein the lookup table is a 2×2 lookup table.

In some embodiments, the lookup table is generated for use with the particular set of synthetic energy channels employed for the second projection data.

In some embodiments, the method may involve accessing a lookup table database which stores a respective material decomposition lookup table for each of a plurality of different possible sets of synthetic energy channels (i.e. each of a plurality of different sets of weights). During operation, given the set of weights which is to be used for defining the synthetic energy channels, a corresponding lookup table may be identified in the lookup table database designed for application to projection data comprising the relevant set of synthetic energy channels formed using the given set of weights.

In some embodiments, there may be a plurality of cost functions available which evaluate different measures of error, such as different measures of noise (variance) or bias or a weighted sum of both. Different cost functions may be optimized for estimating predicted measures of error for different material decomposition tasks.

In some embodiments, the method may include a step of selecting a cost function from a pre-defined set of two or more cost functions, wherein a cost output from each cost function is representative of a different respective measure of error for outputs of the material decomposition algorithm.

The optimization may involve more than one cost function, for example using a multi-parameter optimization in which a combined value of two or more error measures are sought to be minimized.

In some embodiments, the optimization may be performed using a numerical optimizer. By way of example, the optimization may be performed using the Constrained Optimization by Linear Approximation algorithm (COBYLA). This is capable of performing optimization in the case of objective functions which are non-linear and/or which cannot be easily differentiated. It does not require determining a gradient of the objective function for example.

In some embodiments, the first projection data and second projection data are photon count projection data. Embodiments of the invention find particularly advantageous application to photon count data because, as discussed above, photon counting detector data is typically larger in size than energy integrating detector data.

Another aspect of the invention is a processing device, comprising one or more processors configured to perform a method in accordance with any embodiment described in this disclosure.

Another aspect of the invention is a system, comprising a processing device in accordance with any embodiment or claim, and a computed tomography (CT) imaging apparatus for acquiring spectral CT image data.

Another aspect of the invention is a method for data reduction of multi-energy computed tomography, CT, projection data, comprising:

- obtaining first CT projection data comprising data for each of a set of three or more measured x-ray energy channels;
- transforming the first projection data into second projection data, wherein the second projection data comprises data for a set of two or more synthetic energy channels, each formed as a weighted combination of the measured energy channels, wherein the number of synthetic energy channels is less than the number of measured energy channels;
- wherein the transforming the first projection data into the second projection data comprises: accessing a weight database, wherein the weight database stores a plurality of pre-determined sets of weights for the three of more measured energy channels, each for defining a respective set of synthetic energy channels; selecting one of the plurality of sets of weights; and using the selected set of weights to define the two or more synthetic energy channels of the second projection dataset.

Each set of weights in the weight database may for example be a set of weights derived by applying a respective instance of the optimization procedure discussed previously, or described in any embodiment of this disclosure. However, this is not essential and the weights in the weight database may have been computed in any desired way.

In some embodiments, each set of weights in the weight database may be tagged according to a target imaging scenario for which it is intended for application, and wherein the selecting from the database is performed based on querying the database with a target imaging scenario to be performed. However, this is not essential.

For example, each set of weights in the database may be optimized for application in a defined imaging scenario, and wherein the selecting from the database is performed based on querying the database with a target imaging scenario to be performed.

In some embodiments, the method further comprises accessing a LUT (lookup table) database, the lookup table database storing a plurality of pre-computed lookup tables, each for mapping CT measurement values in a respective set of synthetic energy channels to corresponding estimated material values (e.g. material path lengths), e.g. in accordance with a particular forward model, and wherein each lookup table in the database is tagged according to the particular set of synthetic energy channels (or corresponding weights) for which it is suitable to be applied. Each lookup table may for example be computed in advance using a forward model which for example has been modified to reflect a particular combination of synthetic energy channels.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
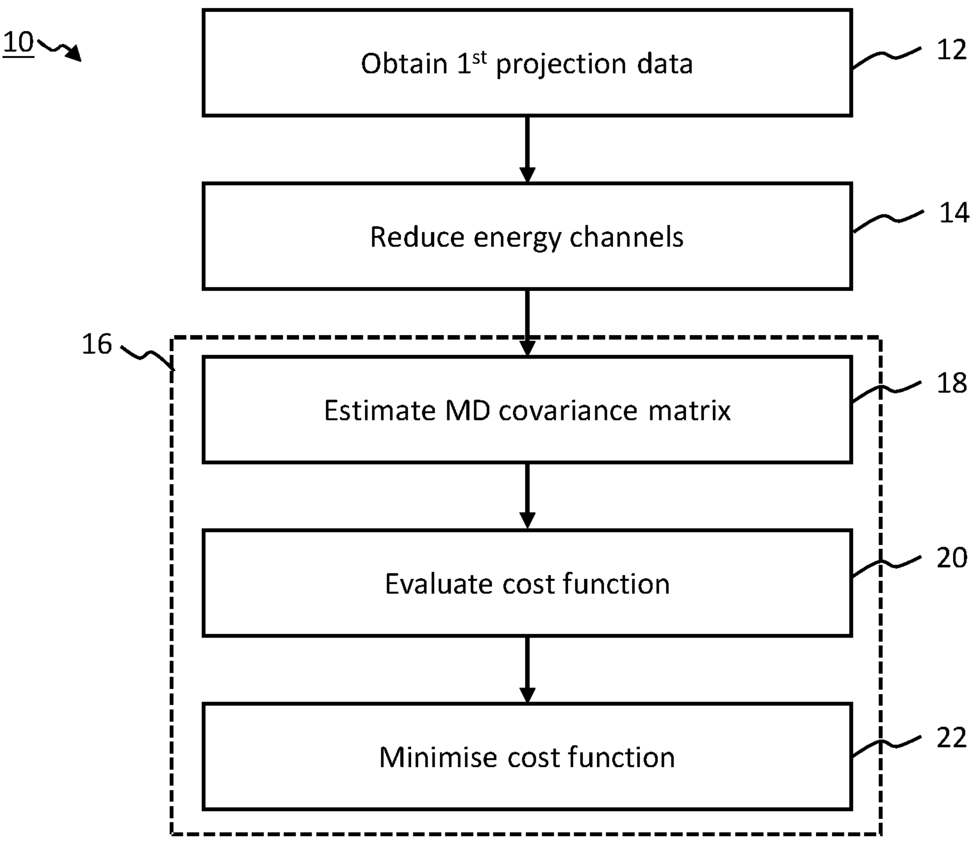
FIG. 1 outlines steps of an example method in accordance with one or more embodiments of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for data reduction in the context of spectral CT imaging. The method comprises reducing the number of spectral channels of the acquired CT data by a reduced set of synthetic energy channels, each from a weighted combination of the original measured energy channel. The weights are selected in an optimization process in which an error metric associated with an output of a material decomposition procedure to be applied to the CT data is estimated, and the weights are adjusted to minimize a value of the error metric. The error might for example be a variance or noise estimate, and/or a bias estimate.

It is noted that in the context of this disclosure the terms 'energy channel' and 'spectral channel' may be used interchangeably.

Embodiments of the present invention allow for a reduction in the number of spectral channels from a spectral CT system down to as few as N=2 spectral channels, while maintaining the quality advantages achieved by a multi-energy system with three or more energy channels.

Embodiments of the present invention are applicable to any source of spectral x-ray data. One advantageous application is for spectral CT projection data. By way of background, brief explanation of the basic principles of material decomposition as applied in spectral x-ray based imaging (including but not limited to CT imaging) will now be discussed.

By using multi-energy x-ray detectors, and/or a multi-energy x-ray source, it is possible to measure the spectrum of x-ray energies received at different locations across an x-ray detector during x-ray imaging of an object. In particular, it is possible to measure detection data at each pixel in each of a plurality of different x-ray energy levels or energy bands. This is known as spectral x-ray imaging. Spectral x-ray data allows for discerning and quantifying materials comprised by the scanned object. It can be performed using data from a conventional x-ray imaging modality or from CT imaging.

Material decomposition can be achieved based on a pixel-wise inversion of the system forward model, which model describes the theoretical signal expected in individual x-ray detector energy channels as a function of a certain set (basis) of materials comprised by the object and their respective equivalent path lengths. This procedure is called basis material decomposition.

The basic principles of spectral x-ray based material decomposition, as applied in embodiments of the present invention, will now be briefly discussed. A more detailed discussion of the underlying principles of material decomposition applied herein can also be found in the paper: K. C. Zimmerman and T. G. Schmidt, Experimental comparison of empirical material decomposition methods for spectral CT, Physics in Medicine & Biology, 60 (2015) 8.

When an x-ray photon strikes a photon-counting detector, the photon is converted to electrical charge proportional to the energy of the incoming photon. The charge may be converted to a voltage using charge-integrating amplifiers. Analog comparators can be used to increment a digital counter when the voltage of the accumulated charge exceeds a set threshold level. At the end of an acquisition of a single projection, the number of photons detected with energy above the threshold can be counted. Energy bin data can be generated corresponding to the number of photons detected between two threshold levels based on subtracting consecutive counter measurements. In this way, a photon count for a plurality of x-ray energy bins can be generated.

It is noted that for the purpose of the following description, use of a spectral photon counting detector will be assumed. However, other types of detectors are also possible such as spectral energy integrating detectors (EIDs) such as dual-layer detectors. Here it is utilized that low energy photons are predominantly absorbed in the upper layer while high energy photons are predominantly absorbed in the lower layer.

The case may be considered of an x-ray measurement through a material of thickness x and attenuation coefficient $\mu(E)$, where E is the energy of photon traversing the material. The x-ray attenuation of a composite material can be expressed as a linear combination of the attenuation of a set of basis materials comprised by the material. More particularly, and as explained in K. C. Zimmerman (2015), the x-ray attenuation through this material is equivalent to the attenuation of a unique combination of any two other materials (in the absence of K-edges), as expressed in equation (1) below, where $\mu_1(E)$ and $\mu_2(E)$ are the energy-dependent attenuation coefficients of each of two basis materials and $l_1$ and $l_2$ are the (equivalent) path lengths of each of the two basis materials. This decomposition is possible because there exist two primary attenuation phenomena in the diagnostic x-ray energy range: Compton scattering and photoelectric absorption. Mathematically formulated, a line integral along a line L of the spatially varying linear attenuation coefficient of an object can be written as $$\int_L \mu(E, x)dx = l_1\mu_1(E) + l_2\mu_2(E) \tag{1}$$

This basis expansion can be extended, so that the expected number of photons detected in the $i^{th}$ energy bin, $c_i$, of an ideal photon-counting detector can be modelled as, $$c_i(l) = \int_{E_i}^{E_{i+1}} S(E)\exp\left[-\sum_{j=1}^{M} l_j\mu_j(E)\right]dE \tag{2}$$

where S(E) is the x-ray source spectrum and $l_j$, the elements of l, are the thicknesses of M basis materials having attenuation coefficients functions, $\mu_j$. The spectral measurements are represented as a vector of detected photon counts, $c=[c_1, c_2, \ldots, c_N]^T$, where N is total the number of energy channels.

Material decomposition in general terms involves estimating the vector of basis material thicknesses, l, from the acquired spectral data, c. One method of estimating the basis material thicknesses, l, from the number of detected photons, c, is to numerically invert equation (2), for example using statistical estimation algorithms such as maximum likelihood estimation, (MLE).

Another approach which is often employed is to use a simple look-up table which allows for mapping between detection data and material path lengths. Other approaches are also possible including applying a polynomial model, or implementing an artificial intelligence (AI)-based model.

In the context of material decomposition within spectral x-ray imaging, "path length" refers to the physical distance that x-ray photons travel through a specific material within the subject being imaged along a beam path from the source to the relevant detector pixel. Each type of material in the subject's body—such as bone, soft tissue, or contrast agents—has a unique attenuation coefficient, $\mu$, which determines how much the x-ray beam is absorbed or scattered while passing through it. In the context of the above description, the vector l represents the vector of material path lengths for the different basis materials.

In the context of this disclosure, the term CT projection data refers to measurement data at the level of the x-ray detector, which includes measurement values for two or more different energy levels/channels/bins at each pixel of the detector array and for each x-ray projection event. In the context of CT imaging, this is sometimes referred to as spectral projection data. If spectral data are acquired using fast kVp switching, then the different energy channels are measured interleaved in time and may be re-interpolated to a common set of geometrical lines in a pre-processing step before material decomposition.

In the context of this disclosure, 'material decomposition data' may refer to the output of the material decomposition procedure applied to the projection data but before any application of image reconstruction. This is sometimes called material-specific measurement data. In the case of CT imaging, this is sometimes referred to as material projection data. In some examples, this may take the form of material path lengths, l, for each basis material, for each pixel of the detector and for each x-ray projection event. Alternatively, material decomposition data may refer to a material image reconstructed from the material measurement data.

FIG. 1 outlines in block diagram form steps of an example method according to one or more embodiments. The steps will be recited in summary, before being explained further in the form of example embodiments.

Provided is a method 10 for data reduction of multi-energy (spectral) computed tomography (CT) projection data.

The method 10 comprises obtaining 12 first projection data comprising data for each of a set of three or more measured energy channels. In a preferred set of embodiments, the first projection data may be photon count data acquired with a photon counting detector. By way of example, the multi-energy projection data can be acquired either by using a single photon-counting detector with N>2 energy bins, a single photon-counting detector in combination with a kVp-switching tube, or a Dual-Layer detector in combination with a kVp-switching tube.

The method further comprises transforming 14 the first projection data into second projection data, wherein the second projection data comprises data for a set of two or more synthetic energy channels, each formed as a weighted combination of the measured energy channels. The number of synthetic energy channels is less than the number of measured energy channels. Thus, the transformation reduces the number of energy channels.

The weights of the weighted combination for each synthetic energy channel are determined in an optimization procedure 16. The optimization procedure may be performed in advance of acquisition of the first projection data, but could also be done in real time.

In a most general sense, the optimization procedure 16 for example comprises estimating a value indicative of or correlated with a predicted measure of error of outputs of a known material decomposition procedure if applied to data binned according to a candidate set of synthetic energy channels defined by a candidate set of weights. The optimization procedure may comprise iteratively adjusting the candidate weights to minimize this error measure and thereby arrive at optimized weights.

For example, the optimization procedure may comprise minimizing a value of a cost function, wherein a cost output from the cost function is correlated with a predicted measure of error for outputs of the material decomposition algorithm if applied to data binned according to the candidate set of synthetic energy channels. The optimization procedure may further comprise adjusting the candidate weights iteratively to minimize the cost output and thereby arrive at an optimized set of weights.

The predicted measure of error which is minimized in the optimization procedure may for example comprise at least a component which is correlated with a predicted bias of the output of the material decomposition procedure if applied to data binned according to the candidate set of synthetic energy channels. Additionally or alternatively, the predicted measure of error which is minimized in the optimization procedure may for example comprise at least a component which is correlated with a predicted variance or covariance (i.e. noise) of the outputs of the material decomposition procedure if applied to data binned according to the candidate set of synthetic energy channels.

In the particular example of FIG. 1, the optimization procedure 16 for determining the weights comprises applying an error estimator model configured to receive as input a candidate set of synthetic energy channels formed according to a candidate set of weights of the weighted combination, and to generate 18 as output a predicted covariance matrix of outputs of a pre-defined material decomposition algorithm if the algorithm were to be applied to the candidate energy channel data.

The optimization procedure 16 in the example of FIG. 1 further comprises applying 20 a pre-defined cost function to the covariance matrix, wherein a cost output from the cost function is correlated with a predicted measure of error for the outputs of the material decomposition algorithm. For example, this may be a predicted measure of noise or variance or covariance.

The optimization procedure 16 may further comprise adjusting the candidate weights iteratively to minimize the cost output.

The example optimization procedure 16 of FIG. 1 represents one advantageous set of embodiments. However, the optimization procedure may be performed in a different way which achieves the same effect of adjusting the synthetic energy channel weights so as to minimize a predicted measure of error of outputs of a material decomposition algorithm is applied to data binned according to the synthetic energy channels.

In some embodiments, the optimization procedure comprises modifying a forward model for the material decomposition algorithm in accordance with the synthetic energy channels and computing the estimated error measure based on analysis of the modified forward model. For example, an initial forward model for the material decomposition algorithm may include a respective term or element for each of the measured energy channels, and wherein the modifying the forward model comprises forming a weighted combination of these terms or elements with weights which correspond to the candidate weights for the synthetic energy channels.

As noted above, the method can also be embodied in hardware form, for example in the form of a processing device which is configured to carry out a method in accordance with any example or embodiment described in this document, or in accordance with any claim of this application.

Figure 2:
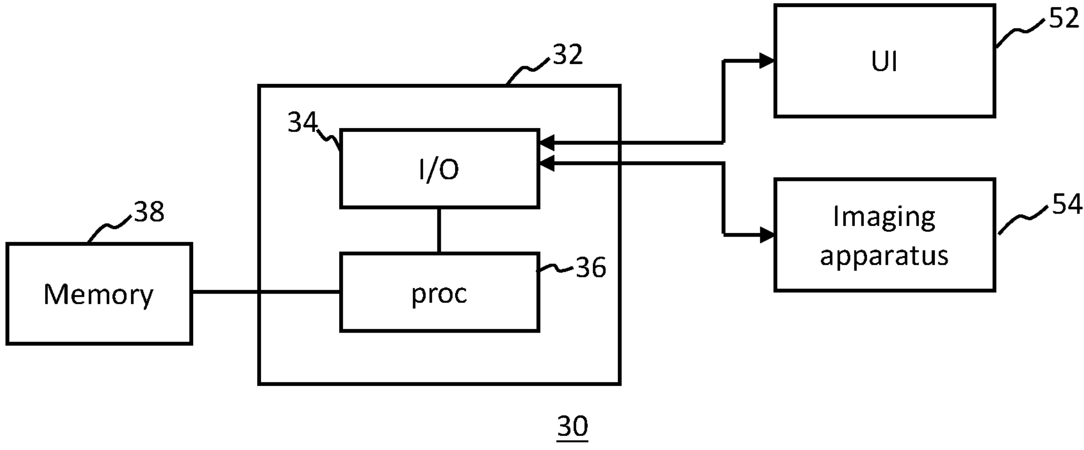
FIG. 2 is a block diagram of an example processing device and system in accordance with one or more embodiments of the invention.

To further aid understanding, FIG. 2 presents a schematic representation of an example processing device 32 configured to execute a method in accordance with one or more embodiments of the invention. The processing device is shown in the context of a system 30 which comprises the processing device. The processing device alone represents an aspect of the invention. The system 30 is another aspect of the invention. The provided system need not comprise all the illustrated hardware components; it may comprise only subset of them.

The processing device 32 comprises one or more processors 36 configured to perform a method in accordance with that outlined above, or in accordance with any embodiment described in this document or any claim of this application. In the illustrated example, the processing device further comprises an input/output 34 or communication interface.

In the illustrated example of FIG. 2, the system 30 further comprises a user interface 52. In the illustrated example of FIG. 2, the system 30 further comprises CT imaging apparatus 54 for acquiring spectral CT data. The CT imaging apparatus may comprise a photon counting detector for obtaining photon count CT projection data.

The system 30 may further comprise a memory 38 for storing computer program code (i.e. computer-executable code) which is configured for causing the one or more processors 36 of the processing unit 32 to perform the method as outlined above, or in accordance with any embodiment described in this disclosure, or in accordance with any claim.

As mentioned previously, the invention can also be embodied in software form. Thus, another aspect of the invention is a computer program product comprising computer program code configured, when run on a processor, to cause the processor to perform a method in accordance with any example or embodiment of the invention described in this document, or in accordance with any claim of this patent application.

The basic concept of the invention comprises reduction of the number of spectral channels of acquired multi-energy CT projection data according to the following general scheme:

$$SC_1 = \sum_{i=1:N} W_{1,i} \cdot MC_i$$

$$SC_2 = \sum_{i=1:N} W_{2,i} \cdot MC_i$$

where $MC_i$ are the input measured energy channels, $W_{1,i}$ and $W_{2,i}$ are optimized weights, derived using an optimization procedure (discussed in more detail below), for a given targeted application, and outputs $SC_1$ and $SC_2$ are the reduced (synthetic) energy channels used for the reduced second projection data.

More generally this could be expressed as $$SC_n = \sum_{i=1:N} W_{n,i} \cdot MC_i$$

for a scheme of any given number of two or more synthetic energy channels, $SC_n$.

The second projection data, comprising data for the synthetic energy channels, can be used as input to a material decomposition algorithm. The material decomposition algorithm may employ for example a lookup table LUT, for example a 2×2 lookup table (tailored to a given specific set of weights).

The transformation of the energy channels can further be considered in terms of the effect on the forward model for the material decomposition algorithm. As mentioned above, the forward model for a material decomposition can be understood as represented by the following model equation which models the expected number of photons detected in the $i^{th}$ energy bin (channel), $c_i$, of an ideal photon-counting detector as:

$$c_i(l) = \int_{E_i}^{E_{i+1}} S(E)\exp\left[-\sum_{j=1}^{M} l_j \mu_j(E)\right] dE$$

where S(E) is the x-ray source spectrum and $l_j$, the elements of l, are the thicknesses of M basis materials having attenuation coefficients functions, $\mu_j$. The spectral measurements are represented as a vector of detected photon counts, $c=[c_1, c_2, \ldots, c_N]^T$, where Nis total the number of energy channels.

This could be re-formulated by defining the spectral model, $S_i(E)$, for channel i as:

$$S_i(E) = \begin{cases} S(E) & \text{for } E_i \le E < E_{i+1} \\ 0 & \text{else} \end{cases}$$

such that the forward model equation can be re-expressed as $$c_i(l) = \int_0^{\infty} S_i(E)\exp\left[-\sum_{j=1}^{M} l_j \mu_j(E)\right] dE$$

Considering the synthetic energy channel scheme $$SC_1 = \sum_{i=1:N} W_{1,i} \cdot MC_i$$

$$SC_2 = \sum_{i=1:N} W_{2,i} \cdot MC_i$$

then the forward model for the synthetic energy channels can be expressed, in modified form, as:

$$SC_n(l) = \sum_{i=1:N} W_{n,i} c_i(l) = \int_0^{\infty} \left[\sum_{i=1:N} (W_{n,i} S_i(E))\right] \exp\left[-\sum_{j=1}^{M} l_j \mu_j(E)\right] dE$$

for synthetic energy channel $SC_n$.

In other words, the spectral model of a linear combination of channels is the corresponding linear combination of the spectral models. This holds true also if the first channels are not binned data.

In some embodiments, the weights, $W_{1,i}$ and $W_{2,i}$, may be optimized differently according to different imaging scenarios, e.g. different imaging goals or figures-of-merit, as further described below.

It is noted that, although in the above example, there are two synthetic energy channels, $SC_1$ and $SC_2$, in further embodiments, there may be more than two synthetic energy channels, so long as the number of synthetic energy channels M is less that the number of physically measured energy channels N. Two is a preferred number, for reasons of minimizing the data amount, while maintaining sufficient spectral information to perform the material decomposition.

In some embodiments, the aforementioned optimization procedure 16 is performed in advance of the transformation 14 of the first projection data to the second projection data, and may be done in advance of obtaining 12 the first projection data. For example it may be done as part of a configuration or setup operation, prior to performance of any imaging operation. In this case, when performing the method during imaging, the optimization procedure may be omitted. Instead, the method may comprise steps of:

accessing a weight database, wherein the weight database stores a plurality of pre-determined sets of weights for the three of more measured energy channels, each for defining a respective set of synthetic energy channels; selecting one of the plurality of sets of weights; and using the selected set of weights to define the two or more synthetic energy channels of the second projection dataset. In some embodiments, each set of weights in the database is optimized for application in a defined imaging scenario, and wherein the selecting from the database is performed based on querying the database with a target imaging scenario to be performed.

The database may be searched according to criteria which may include, by way of example, a target imaging scenario. For example, this may comprise planned acquisition parameters, e.g., the tube spectra, the detector sensitivities, the tube currents, and/or the imaging objectives, e.g., the clinical objective to optimize (e.g., iodine density, soft-tissue contrast, 511 keV mono-image, etc.).

In some embodiments, the optimization procedure 16 comprises a step of storing the optimized set of weights in a weight database.

In some embodiments, the step of transforming 14 the first projection data into the second projection data comprises accessing the weight database to retrieve the optimized set of weights and using the optimized set of weights to define the two or more synthetic energy channels of the second projection dataset.

In some embodiments, the weight database stores a plurality of pre-determined sets of weights for the three of more measured energy channels, each for defining a respective set of synthetic energy channels. In some embodiments, each set of weights may be derived by applying a respective instance of the optimization procedure.

In some embodiments, the transforming the first projection data into the second projection data comprises accessing the weight database, selecting one of the plurality of sets of weights and using the selected set of weights to define the two or more synthetic energy channels of the second projection dataset.

In some embodiments, each set of weights in the database is optimized for application in a defined imaging scenario, and wherein the selecting from the database is performed based on querying the database with a target imaging scenario to be performed.

In some embodiments, the method 10 may further comprise a step of applying the pre-defined material decomposition algorithm to the second projection data.

As mentioned above, for reasons of computational efficiency, in some embodiments, applying the material decomposition algorithm may comprise applying a pre-computed lookup table which is configured to map between measurement values of the synthetic energy channels and material values for each of two or more basis materials. In some embodiments, there may be two synthetic energy channels and two basis materials and wherein the lookup table is a 2×2 lookup table.

In some embodiments, the lookup table is generated for use with the particular set of synthetic energy channels (i.e. the specific set of optimized weights) employed for the second projection data.

In some embodiments, the method may involve accessing a lookup table database which stores a respective material decomposition lookup table for each of a plurality of different possible sets of synthetic energy channels (i.e. each of a plurality of different sets of weights). During operation, given the set of weights which is to be used for defining the synthetic energy channels, a corresponding lookup table may be identified in the lookup table database designed for application to projection data comprising the relevant set of synthetic energy channels formed using the given set of weights.

It will be recognized that one important consideration is the determining of the weights in a manner that minimizes impact on the material decomposition results of the reduction of the number of energy channels.

An example optimization procedure for determining the weights in accordance with at least one set of embodiments will now be described. For purposes of illustration, in this example, the CT projection data is assumed to be photon count data, but the same procedure can be applied for other types of x-ray measurement data.

It is firstly noted that an ideal solution would be to perform an optimization which employs an objective function in the form of a fixed analytical expression. However, the entire imaging chain, starting at the x-ray generation and ending with the material decomposition (MD) is nonlinear and complex. It is therefore a challenge to derive an analytical expression for the optimization of the weights.

It is proposed according to the present set of embodiments to perform a numerical optimization procedure, utilizing a system forward model for the CT imaging apparatus and numerical objective function estimators. Optimal weights depend on the spectral responses of the measured energy channels. These responses in turn depend upon the energy thresholds of the detector. Optionally, these thresholds may be assumed to be adjusted as parameters of the CT imaging system, and optimization of these thresholds may be integrated into the optimization of the weights. However, this is not essential.

The various factors may be incorporated into the forward model which characterizes the material decomposition and the forward model analyzed, e.g. using statistical techniques, to assess as estimated measure of error associated with material density estimates which may be output from it.

Figure 3:
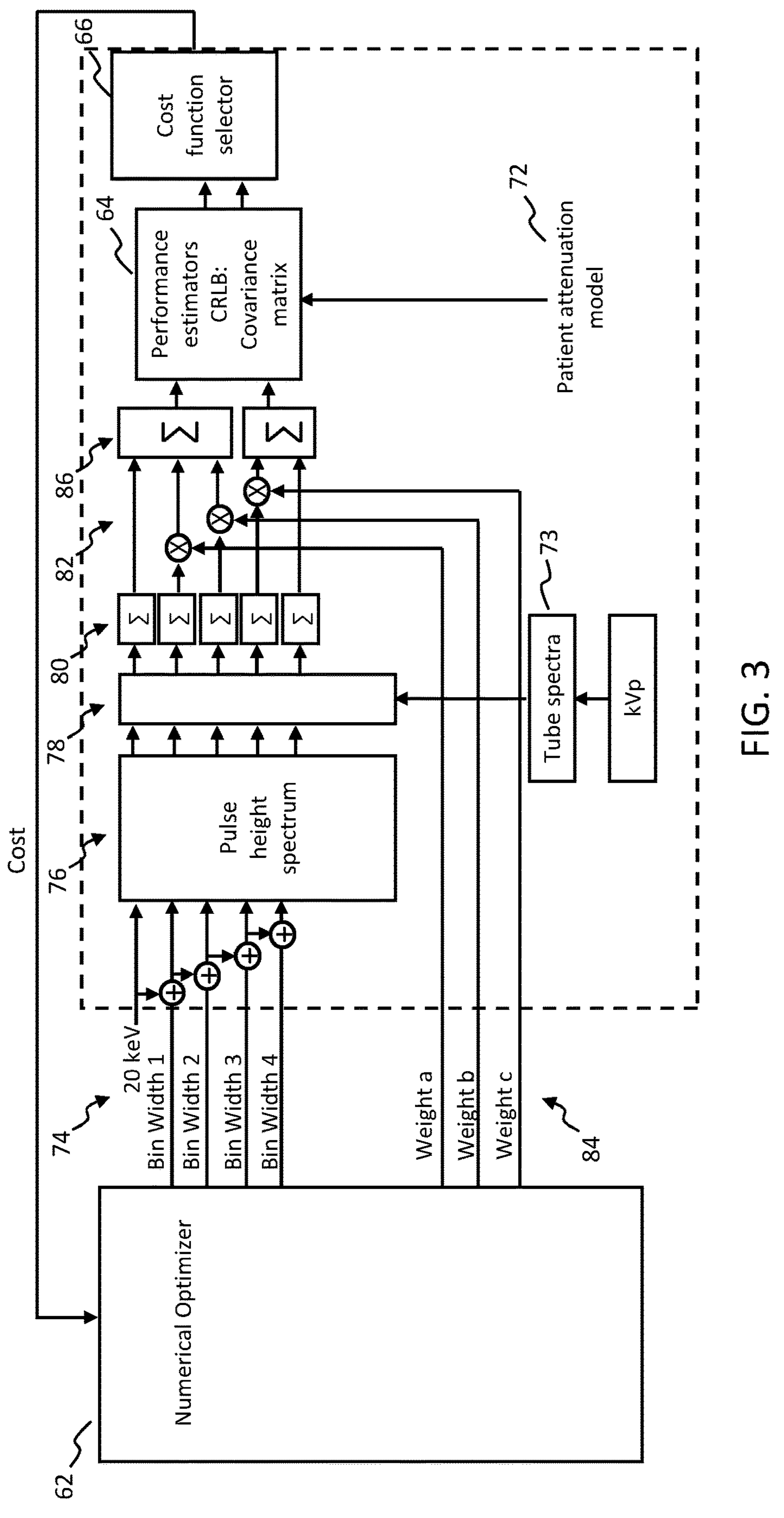
FIG. 3 schematically illustrates an example optimization procedure for configuring weights of a reduced set of synthetic energy channels.

An outline of the example optimization procedure is schematically represented in FIG. 3.

The optimization procedure includes a numerical optimizer module 62. The numerical optimizer module 62 is configured to minimize a cost function by varying free parameters.

Numerous optimization algorithms exist for performing this task. According to one specific embodiment, an algorithm known as the Constrained Optimization BY Linear Approximation algorithm (COBYLA) may be used. The optimizer module 62 is configured to vary the free parameters of the cost function in order to minimize the cost value of the cost function. The free parameters include at least the weights of the synthetic energy channels. Optionally, the free parameters of the cost function may additionally include one or more adjustable acquisition parameters of the CT imaging apparatus (if the weights are pre-computed). For example, these may include one or more of the energy thresholds of the detector energy bins (e.g. in the form of an energy width of each energy bin). As will be explained, these may affect the effective input spectra, S(E) to the forward model.

The cost function is configured such that an evaluated output of the cost function is indicative or correlated with an estimate or prediction of an error measure/metric associated with an output of a pre-defined material decomposition algorithm if the algorithm were to be applied to the candidate energy channel data with the set of weights currently set for the cost function.

In some embodiments, the material decomposition algorithm is characterized by a forward model which models expected measurements in each of a set of measured energy channels given a material composition along a beam path to the detector, and the method may comprise modifying or configuring the forward model to model instead expected measurements in a set of candidate synthetic energy channels given the material composition. The cost function may be a function which evaluate an expected measure of error, such as variance or bias, based on the modified form of the forward model.

A preferred approach to achieving this is to apply an error estimator model 64 configured to generate as output a predicted covariance matrix of outputs of the pre-defined material decomposition algorithm if the algorithm were to be applied to projection data comprising the candidate synthetic energy channel. From the covariance matrix, one or more error metrics can be derived indicative of one or more measures of error, for example indicative of noise, variance or co-variance.

For example, this may comprise computing a covariance matrix for the modified forward model for the candidate synthetic energy channels.

For example, in the example illustrated in FIG. 3, the error estimator model 64 is configured to estimate the covariance matrix of the outputs of a pre-defined material decomposition model and also to output an expected bias of the outputs of the pre-defined material decomposition model.

According to one set of embodiments, it is proposed that the error estimator model employ the so-called Cramer Rao Lower Bound (CRLB) method for determining the estimation of the covariance matrix. Full details of an example application of the CRLB method for estimating the covariance matrix of the MD outputs can be found in the following paper: E. Roessl and C. Herrmann, "Cramer-Rao lower bound of basis image noise in multiple-energy x-ray imaging," Physics in Medicine & Biology 54(5), 1307 (2009).

For example, the original forward model for the measured energy channels may be modified so as to define a forward model for the synthetic energy channels (e.g. by taking a linear combination of components or elements of the original forward model) and then a CRLB of a covariance matrix for the forward model computed, e.g. using the method outlined in the above paper.

From the output of the error estimator model 64, one or more error measures or metrics can be derived for the transformed (reduced channel) projection data (i.e. the second projection data). These can be derived by applying one or more cost functions to the output of the error estimator module, wherein a cost output from each cost function is correlated with a predicted measure of error for the outputs of the material decomposition algorithm.

For example, the covariance matrix can be used to estimate the noise of various results of the material decomposition. Examples include the noise in a contrast agent map based on a water/iodine decomposition or the expected noise in so-called Mono-E images (sometimes called Virtual-Monoenergetic-Images VMI) representing virtual images of a monoenergetic scan. These Mono-E images are used in clinical practice to improve the contrast (e.g. Mono-E for E=40 ke V), to get a beam hardening free conventional image (e.g. Mono-70 keV) or for images with reduced metal artifacts (e.g. Mono-140 keV). One or more cost functions can be derived in advance which, when applied to the covariance matrix results in an output cost value which is correlated with a predicted aspect of error of the material decomposition data resulting from the candidate synthetic energy channels.

For example, the case may be considered of a material decomposition into photo and scatter. The covariance matrix is indicative of the noise variance and covariance of the estimated material line integrals. Considering an example of Mono-E images, these are obtained by linear combination of the photo and scatter line integrals. Using the full noise covariance matrix, it is possible to estimate the noise of the Mono-E image based on a linear combination applied to the covariance matrix using standard Gaussian error propagation. Thus, it can be seen that a cost function tailored to the specific type of material image being targeted (i.e. the imaging scenario) by taking a function of the full covariance matrix which depends upon the construction of the material image from the basis decomposition.

In some embodiments, multiple cost functions can be derived in advance, each configured for outputting a value correlated with a different error measure, or an error measure associated with a different imaging application.

This is illustrated in the example of FIG. 3 which includes a cost function selector 66 which is configured to select one of a plurality of available cost functions, each configured to output a cost value correlated with a different image quality quantity, or a different measure of error. The user may choose the one or more cost functions to select, or the system may choose for example based on a specified target imaging application.

Example cost functions may include a variance cost function which outputs a result which is a function of the diagonal elements of the covariance matrix. The diagonal elements of the covariance matrix represent the estimated variances of the material decomposition results, i.e. the expected variance in the concentrations of different materials identified by the material decomposition algorithm. The variance is a direct measure of the noise level; higher variances indicate greater noise in the material decomposition outputs.

Another example cost function might be an overall uncertainty cost function. This may operate on the covariance matrix to output a result which is correlated with the trace of the covariance matrix (the sum of the diagonal elements). This is often used as an overall indicator of the noise level in the data. A larger trace suggests higher overall uncertainty in the estimates due to noise.

Another example cost function might be a covariance and correlated noise function. This may operate on the covariance matrix to output a result which is correlated with one or more off-diagonal elements of the covariance matrix. The off-diagonal elements of the covariance matrix are indicative of covariance between pairs of output values of the material decomposition algorithm. Non-zero off-diagonal elements suggest that there is correlated noise between these output values. This is significant as it can be an indication that errors in estimating one output parameter of the material decomposition algorithm are systematically related to errors in estimating another.

In some embodiments, the error estimator model 64 is configured to generate as output a predicted bias of outputs of the pre-defined material decomposition algorithm if applied to the data comprising the candidate synthetic energy channels. The error estimator model may generate this in addition to the covariance matrix or instead of the covariance matrix. In this case, the cost function may be bias cost function which is applied to the predicted bias output from the error estimator model 64 and a cost output from the cost function is correlated with a predicted measure of bias of the outputs of the material decomposition algorithm if the candidate set of synthetic energy channels is used.

To estimate the bias, the error estimator model may for example follow the following general process. The spectral forward model can be used to calculate, for a defined sample material combination, expected first projection data. A physical model of the detection process is used which includes a noise model for the first projection data. From this it is possible to simulate an ensemble of measured data. The ensemble of measured data can be transformed from the measured set of energy channels into any one or more candidate sets of synthetic energy channels, and the material decomposition procedure then applied. For a given one of the candidate sets of synthetic energy channels, the bias can then be estimated as the difference between the defined sample material combination (used at the start to simulate the measurement data) and a mean of the output of the material decomposition applied to that candidate set of energy channels. Note that this method can also be used to estimate a covariance matrix instead of using the CRLB method.

Returning to FIG. 3, the CRLB may be used to estimate the noise performance for a specific patient attenuation model 72. There is a strong impact of the attenuation to the noise performance of CT imaging. The patient attenuation model models the attenuation response of the patient's body to a certain emission spectrum of the x-ray source. The patient attenuation model may therefore be provided as an input to the CRLB algorithm or the equations employed in the CRLB algorithm may be configured in accordance with the patient attenuation model 72. The patient attenuation model may in particular be integrated into the CRLB procedure as part of the forward model of the material decomposition algorithm. In particular, incorporating the patient attenuation model may comprise or consist of configuring the material attenuation coefficients of the forward model in accordance with a set of personalized material attenuation coefficients of the patient.

The main effect of the patient attenuation model in the material decomposition is given by the x-ray path length through the patient (e.g. the abdomen of an obese adult versus a small infant) and secondly by the amount of calcium or metal (e.g. bone or implants). The CRLB method can either be optimized for a mean patient and/or can be optimized for different scan protocols dedicated to specific patients (e.g. of different BMI), different scanned body regions and/or different imaging tasks.

The CRLB estimator may further utilize an estimate of the effective input spectra 74 for the material decomposition algorithm and a noise model of the effective input spectra. These may be integrated into the CRLB algorithm as part of the forward model of the material decomposition algorithm, for example by configuring the x-ray spectrum terms S(E). The effective input spectra means, for a given energy emission spectrum of the x-ray source, an expected measured energy spectrum at the detector (i.e. the distribution of measurements in the different energy bins), taking into account response characteristics of both the detector bins and the CT system as a whole.

FIG. 3 schematically illustrates how the effective input spectra are determined. FIG. 3 shows the energy threshold levels of the five energy bins 74. Although five energy bins are shown in this example, a greater or fewer number of bins may instead be used. In this example, the threshold of the first energy bin is 20 keV. The threshold of each next energy bin is defined as a certain bin width above the preceding bin. The four bin widths defining the energy thresholds of bins 2 to 5 are indicated as bin width 1, bin width 2, bin width 3, and bin width 4. The bin responses are estimated by a bin response estimator 76. In this embodiment a so-called pulse height spectrum is used to estimate the bin responses. The pulse height spectrum refers to the distribution of the signal amplitudes (or "heights") generated by the detector in response to the x-rays. Each pulse represents the detection of an x-ray photon, and the height of the pulse is related to the energy of the photon. By analyzing this spectrum, it is possible to estimate the bin responses of the CT system. Bin responses means the responses of the system's detectors to different energy levels of the incoming x-ray photons. This approach enables the modeling of some known detector imperfections such as charge-sharing and pulse pile-up effects. The bin response estimation may be configured as desired so as to take account of more or fewer effects and technical imperfections of the detector.

In addition to the bin responses, the broader system responses to the emitted x-ray radiation are further estimated by a system response estimator 78. This takes account of the intrinsic bin responses already determined by the bin response estimator 76, and takes account of the x-ray source emission spectrum 73. This is used to determine estimated count responses 80 in the five detector energy bins.

The estimated count responses 80 are combined 82 in weighted combinations according to the current candidate set of weights 84 set by the optimizer module 62 in order thereby to define the current candidate set of synthetic energy channels 86. In the examples of FIG. 3, there are two synthetic energy channels formed by respective weighted combinations of the five detector bin channels 80.

With regards to additionally estimating the noise, in the context of photon counting detectors, the noise of the photon count data can be assumed to be Poisson distributed noise for each individual measured energy channel 80, this then modified by the weighted combinations 82 applied in forming the synthetic energy channels.

For the 5 bin photon counting detector used in the illustrated example of FIG. 3, there are a possible total of 10 weights $W_{1,i}$, $W_{2,i}$ for i=1, . . . 5, for forming the two synthetic energy channels, $SC_1$ and $SC_2$:

$$SC_1 = \sum_{i=1}^{i=5} W_{1,i} \cdot MC_i$$

$$SC_2 = \sum_{i=1}^{i=5} W_{2,i} \cdot MC_i$$

where $MC_i$ are the input measured spectral channels, and $W_{1,i}$ and $W_{2,i}$ are the candidate weights.

However, in practice, to simplify the problem, it is possible to reduce set of non-zero weights to $W_{1,1}=1$, $W_{1,2}=a$, $W_{1,3}=b$, $W_{2,4}=C$, $W_{2,5}=1$. This reduces the number of dimensions for the optimization, improves the numerical stability and reduces the computational effort:

$$SC_1 = MC_1 + aMC_2 + bMC_3$$

$$SC_2 = cMC_4 + MC_5$$

This approach is schematically illustrated in FIG. 3 which shows channels $MC_1$, $MC_2$, $MC_3$ combined 82 in a weighted combination to form a first synthetic energy channel and channels $SC_4$ and $SC_5$ combined 82 in a weighted combination to form a second synthetic energy channel. However, it is emphasized that this approach is not essential and, in further embodiments, each synthetic energy channel may be formed as a weighted combination of any two or more of the measured energy channels. For example, each may be a weighted combination of all of the measured energy channels, or at least one may be a weighted combination of just a subset of the measured energy channels. In addition, although five measured energy channels are shown in the example of FIG. 3, instead the system may include any number of three of more measured energy channels.

The error estimator module 64 uses a CRLB method to estimate a predicted covariance matrix of outputs of a pre-defined material decomposition algorithm if the algorithm were to be applied to the candidate synthetic energy channel data 86. The CRLB method uses the patient attenuation model 72 and the system forward model, in combination with the current candidate set of synthetic energy channels 86 and the estimated error associated with each synthetic energy channel to determine a CRLB of the variance for the material decomposition outputs.

For example, the forward model may be modified for application to data binned according to the synthetic energy channels, e.g. using a weighted combination as discussed previously. The attenuation coefficients of the forward model may be configured based on the patient attenuation model. The input spectra, $S_i(E)$ may be configured based on the computed effective input spectra. A CRLB of the covariance matrix for the modified forward model may then be computed for example.

The cost function selector 66 selects a cost function for use in optimizing the weights. The numerical optimizer 62 applies the chosen cost function to the covariance matrix and/or the bias estimation to evaluate a cost output. The numerical optimizer iteratively adjusts the values of the weights 84 and/or the bin widths 74 to minimize the output of the cost function. As discussed above, the cost functions can be determined so that an output of each cost function is correlated with a particular predicted measure of error associated with the material decomposition outputs.

After a successful run of the optimizer 62, the identified optimal weights and optionally also optimal energy thresholds for the energy bins that minimize the cost are reported by the numerical optimizer 62. As discussed above, they may be recorded in a weight database in some examples.

Optimal weights for a given imaging scenario or task may optionally be pre-computed in advance of CT data acquisition for a range of different imaging scenarios. These may be stored in a weight database. Each may be tagged or labelled according to the particular imaging scenario or task for which it is optimized. When imaging is to be performed, the particular imaging task and/or scenario may be selected by a user and the appropriate set of weights for the reduced set of synthetic energy channels can be retrieved from the database. Examples of different imaging scenarios may include for instance: low-dose, pediatric (small patient), or low-bias.

For performing the material decomposition, a lookup table (LUT) may be pre-computed for each identified set of optimal weights. The lookup table is configured to map from the synthetic energy channels defined according to the identified weights to set (e.g. a pair) of material basis values.

Thus, there may be compiled in advance a database of multiple sets of synthetic energy channel weights, each optimized for a particular imaging task or scenario, and wherein for each set of weights there is further stored a respective lookup table (LUT) for use in mapping values of the respective set of synthetic energy channels to corresponding basis component effective path lengths.

To explain further, there may be stored a respective lookup table (LUT) for each of a plurality of possible sets of synthetic energy channels, and wherein each respective lookup table is used to perform the basis decomposition procedure for a second projection dataset which has been converted to that particular set of virtual energy channels.

In operation, it is necessary only to select the desired pre-computed LUT and use the optimal weights for the synthetic energy channels, to achieve a particular desired result.

As mentioned above, a preferred embodiments involves application of a CRLB method. CRLB is a statistical tool used to estimate the lower bound on the variance of unbiased estimators. In other words, it provides a theoretical minimum variance that any unbiased estimator can achieve for a parameter of interest.

In the context of CT material decomposition, the output of the material decomposition algorithm typically includes quantitative estimates of the materials present in the scanned volume based on applying a forward model. These estimates are derived from the CT data, which inherently includes noise due to the imaging process. The CRLB offers a way to understand the best possible accuracy (in terms of variance) that can be achieved by an unbiased estimator of the material concentrations based on the observed CT data.

Generating a covariance matrix of an output of the material decomposition algorithm using the CRLB involves estimating the lower bounds on the variances and covariances of these estimates. The covariance matrix provides insight into not only the variance (uncertainty) of each material estimate but also the covariance between pairs of estimates, the latter indicating how much the estimation errors of one material are correlated with those of another. This is useful for understanding the precision and reliability of the material decomposition outputs and for optimizing the decomposition algorithm and imaging parameters. It can also be used for estimating the variance of linear combinations of the material decomposed data. This is done for instance when calculating virtual monoenergetic images in virtual monoenergetic imaging (VMI).

To compute the CRLB, it is typically necessary to know the statistical properties of the noise in the CT measurements and the specific form of the material decomposition model (i.e. the forward model). This involves calculating partial derivatives of the forward model with respect to the parameters being estimated and then using these derivatives to form the Fisher Information Matrix (FIM). The inverse of the FIM provides the CRLB for the variance-covariance matrix of the parameter estimates.

Full details of a procedure for determining the CRLB for the variance-covariance matrix for the outputs of a pre-defined material decomposition procedure is outlined in the paper: E. Roessl and C. Herrmann, "Cramer-Rao lower bound of basis image noise in multiple-energy x-ray imaging," Physics in Medicine & Biology 54(5), 1307 (2009).

However, a summary of the basic principles can be outlined as follows. Material decomposition in CT imaging aims to quantify the concentrations of different materials within a scanned object. The CT projection data, denoted by y, is related to the material concentrations, denoted by x, through a model that can be expressed as:

$$y = f(x; \theta) + \epsilon$$

where $f$ is the forward model mapping material concentrations to measured data, θ represents the model parameters (e.g., imaging system parameters), and e is the noise in the measurements. For photon counting projection data, the noise can be assumed to be Poisson distributed.

In material decomposition, the objective is to estimate x from y. The precision of any unbiased estimator $\hat{x}$ of x is bounded by the CRLB, which provides a lower bound on the estimator's covariance matrix.

The first step in computing the CRLB is to determine the Fisher Information Matrix (FIM), I(x), which quantifies the amount of information that the observable data, y, carry about the parameters x. In general, this is a function of the forward model and a known probability density function (PDF) of the noise $\epsilon$.

The Cramer-Rao Lower Bound (CRLB) states that the covariance matrix $\Sigma_x$ of any unbiased estimator, $\hat{x}$ is bounded by the inverse of the FIM:

$$\Sigma_x \geq I(x)^{-1}$$

This inequality assumes that $\Sigma_x - I(x)^{-1}$ is a positive semi-definite matrix. The diagonal elements of $I(x)^{-1}$ provide the CRLB for the variance of each estimated parameter, and the off-diagonal elements provide the CRLB for the covariance between parameter estimates.

For non-Gaussian noise, the specific form of the FIM depends on the PDF of the noise distribution, $\epsilon$. A general case may be considered in which projection data, y, is related to the material concentration value x through a forward model $y=f(x;\theta)+\epsilon$, where $\epsilon$ has a known PDF $p(\epsilon;\phi)$, which may depend on parameters $\phi$. Here, the material decomposition algorithm is represented or characterized by the forward model. As discussed above, the forward model becomes modified when the energy channels are transformed into the synthetic energy channels.

The likelihood function $L(y,x,\theta,\phi)$ for observing y given x, $\theta$, $\phi$ (considering noise characteristics) is:

$$L(y, x, \theta, \phi) = p(y - f(x; \theta); \phi)$$

The log-likelihood function $\ell(y,x,\theta,\phi)=\log L(y,x,\theta,\phi)$ is then $$\ell(y, x, \theta, \phi) = \log p(y - f(x; \theta); \phi)$$

The FIM for the parameter vector $\theta$ (assuming $\theta$ includes all parameters of interest, potentially including $\phi$ if the noise parameters are also to be estimated) is calculated as $$I(\theta) = E\left[\left(\frac{\partial \ell(y, x, \theta, \phi)}{\partial \theta}\right)\left(\frac{\partial \ell(y, x, \theta, \phi)}{\partial \theta}\right)^T\right]$$

Thus it can be seen that, by using the CRLB inequality, an estimate of the covariance matrix for the material decomposition procedure which is characterized by forward model $y=f(x;\theta)+\epsilon$ can be derived. When the measurement data is transformed into synthetic energy channels, the forward model becomes modified, as discussed above, and the resultant estimated covariance matrix will also vary. In addition, the error function may also be expected to change when the data are transformed to synthetic energy channels and this may also affect the result of the covariance matrix.

A more detailed treatment of the computation of the covariance matrix CRLB is outlined in the paper: E. Roessl and C. Herrmann, "Cramer-Rao lower bound of basis image noise in multiple-energy x-ray imaging," Physics in Medicine & Biology 54(5), 1307 (2009). In particular, the section titled "2. Theory" describes the general expression for the Fisher information matrix and covariance matrix of an output of a material decomposition (see equation 10 and equation 11). The description given in section "2. Theory" may be applied in embodiments of the present invention to compute the FIM and the covariance matrix. Section "3. Applications" describes a set of example applications of the general expression derived in section 2 which details further how different parameters of the system may be taken into account. For example, section 3.1 describes how the detector bin thresholds, the x-ray tube spectrum, the detector solid angle, the tube current and x-ray exposure time can all be taken into account in computing the covariance matrix. Section 3.2 further describes how the bin responses can be taken into account by using a bin sensitivity function. Section 3.3 describes an example application employing two energy-integrating measurements obtained from the front and rear detectors of a dual-crystal system.

In particular, in embodiments of the invention, equation (8) may be used which takes into account the expected statistical distribution of measurement data to which the forward model is applied and shows how a CRLB of a covariance matrix for the forward model can be computed.

By applying embodiments of the invention, channel reduction can be achieved for acquired projection data, thereby reducing the data transmission (slip ring band width) demands, data storage requirements and hardware requirements for archival storage and cost and data processing.

As discussed above, the weights used to define the reduced set of synthetic energy channels can be optimized either for bias or variance in a patient specific manner in spectral imaging.

The method for reducing the number of energy channels may be applied at various different points along the data processing pipeline. In some embodiments, the method may be applied at the site of the detector (e.g. the data management system) or gantry (before transfer over the slip-ring to other system components), or may occur on the acquisitor or image reconstruction system (e.g. prior to storage on disk), or may be performed immediately prior to the material decomposition step.

Figure 4:
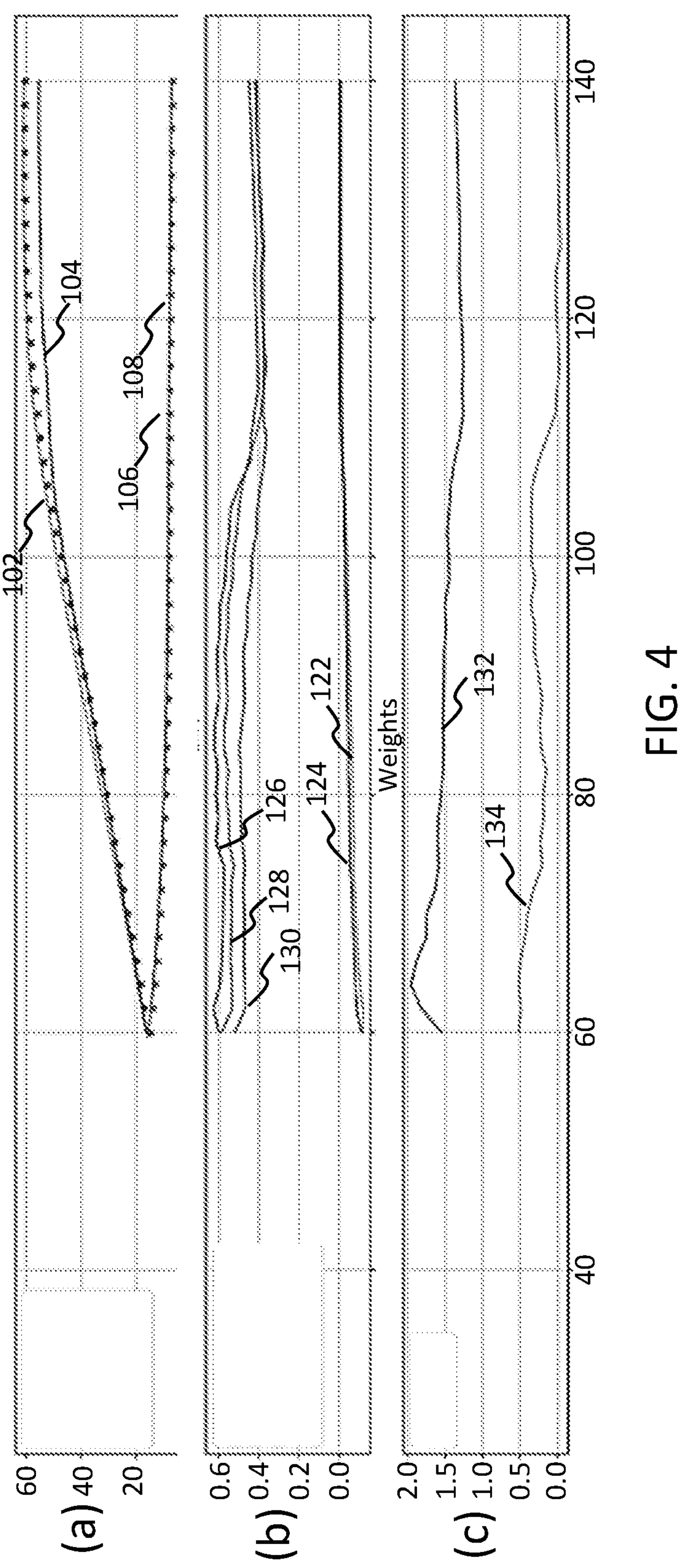
FIG. 4 illustrates results of applying a material decomposition to a reduced projection data set.

Plots showing the advantages of the proposed method applied to photon-counting detectors are illustrated in FIG. 4.

Graph (a) of FIG. 4 shows signal to noise ratio of material decomposition results as a function of tube voltage (units kVp) for each of a plurality of different spectral channel setups. Line 102 corresponds to SNR of a Mono75 image derived using a full 4-bin dataset. Line 104 corresponds to a Mono 75 image generated by applying an embodiment of the present invention in which 4-bin data is reduced to 2 synthetic spectral channels. It can be seen that the SNR is almost the same, achieving >90% of the spectral SNR of the full 4-bin ML decomposition, while reducing data transfer and storage needs by 50%. Likewise, line 106 corresponds to a Mono40 image generated using a full 4-bin dataset, and line 108 corresponds to a Mono40 image generated by applying an embodiment of the present invention in which 4-bin data is reduced to 2 synthetic spectral channels. Here, the SNR of the reduced channel method is nearly identical to the method using the full set of spectral channels.

FIG. 4(*b*) shows estimated bias as a function of tube voltage (in kVp) for each of a plurality of different setups. Line 122 shows bias for a Compton scatter image generated using a full 4-bin dataset. For comparison, Line 124 shows bias for a Compton Scatter image generated by applying an embodiment of the present invention in which 4-bin data is reduced to 2 synthetic spectral channels. Line 126 represents bias for a photoelectric effect image generated using a full 4-bin dataset. Line 128 represents bias for a photoelectric effect image generated by applying an embodiment of the present invention in which 4-bin data is reduced to 2 synthetic spectral channels. It can be seen that the bias is in fact lower using the reduced energy bin dataset.

Line 130 represents bias for a material image generated by applying an embodiment of the present invention in which 4-bin data is reduced to 2 synthetic spectral channels, and for which the weights were optimized for minimized bias. This shows that the weights can be optimized for a low-bias imaging task as opposed to a low-noise imaging task. Bias optimized weights achieve a lower bias than a more costly 4-bin decomposition.

FIG. 4 (*c*) represents optimal weights for the synthetic energy channels as a function of tube voltage (in kVp). Here, for example, a channel reduction scheme may be applied in which the synthetic energy channels are constructed using only two weights. For example, the synthetic energy channels might be constructed as follows:

$$SC_1 = MC_1 + aMC_2$$

$$SC_2 = bMC_3 + MC_4$$

where $SC_1$ and $SC_2$ are the synthetic energy channels, and $MC_1$-$MC_4$ are the measured energy channels, where $MC_1$ and $MC_2$ represent data obtained at low kV reading and $SC_3$ and $SC_4$ are obtained at large kV.

In FIG. 4(*c*), line 132 may represent optimal value for weight a as a function of tube voltage (in kVp) and line 134 may represent optimal value for weight b as a function of tube voltage (in kVp).

Figure 5:
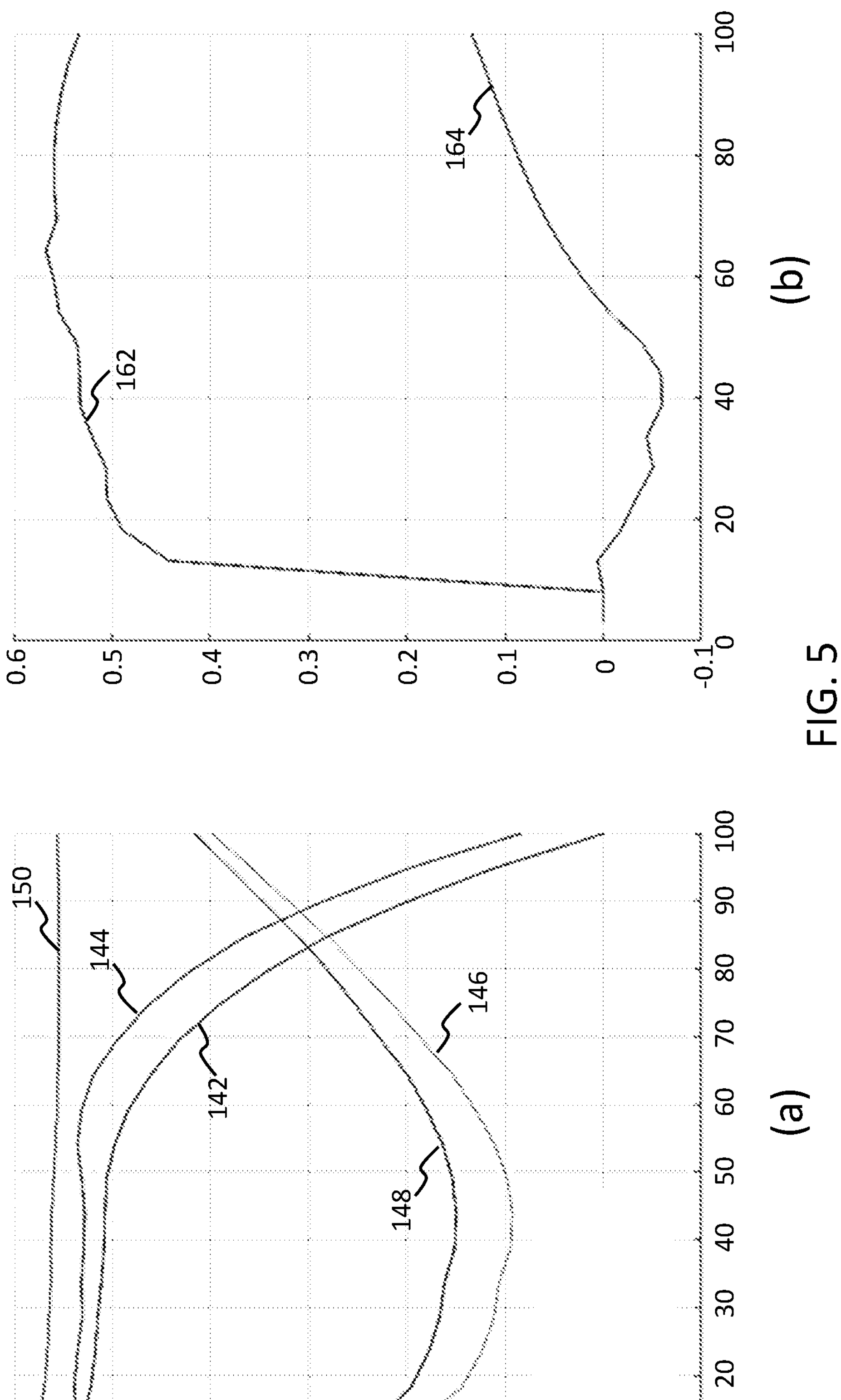
FIG. 5 illustrates performance of the material decomposition as a function of tube power for different combinations of weights.

FIG. 5 illustrates an example of the proposed method applied to a system comprising a dual layer detector in combination with a kVp switching source. Optimal weights deliver >90% of the spectral SNR compared to more costly 4-energy decomposition (100%).

FIG. 5(*a*) shows spectral SNR (%) as a function of tube power (% max) for each of a series of different sets of values of the weights for the synthetic channels. Here again, a scheme assuming four measured energy bins $MC_1$-$MC_4$ and only two weights, a, b, as outlined above is assumed. Line 142 corresponds to weights a=0, b=0. Line 144 corresponds to weights a=1, b=0. Line 146 corresponds to weights a=0, b=1. Line 148 corresponds to weights a=1, b=1. Line 150 corresponds to an optimal set of weights.

As will be observed, the optimal weights result in the highest SNR across all tube power levels.

FIG. 5(*b*) shows optimal values for weights a (line 162) and b (line 164) as a function of tube power (% max).

Embodiments of the invention described above employ a processing device. The processing device may in general comprise a single processor or a plurality of processors. It may be located in a single containing device, structure or unit, or it may be distributed between a plurality of different devices, structures or units. Reference therefore to the processing device being adapted or configured to perform a particular step or task may correspond to that step or task being performed by any one or more of a plurality of processing components, either alone or in combination. The skilled person will understand how such a distributed processing device can be implemented. The processing device includes a communication module or input/output for receiving data and outputting data to further components.

The one or more processors of the processing device can be implemented in numerous ways, with software and/or hardware, to perform the various functions required. A processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for data reduction of multi-energy computed tomography (CT) projection data, comprising:

obtaining first CT projection data comprising data for each of a set of three or more measured x-ray energy channels;

transforming the first projection data into second projection data, wherein the second projection data comprises data for a set of two or more synthetic energy channels, each formed as a weighted combination of the measured energy channels, wherein the number of synthetic energy channels is less than the number of measured energy channels;

wherein weights of said weighted combination forming each synthetic energy channel are determined in an optimization procedure which comprises:

applying an error estimator model configured to receive as input a candidate set of synthetic energy channels formed according to a candidate set of weights for the weighted combination, and to generate as output a predicted covariance matrix of outputs of a predefined material decomposition algorithm;

applying a pre-defined cost function to the covariance matrix, wherein a cost output from the cost function is correlated with a predicted measure of error for the outputs of the material decomposition algorithm; and adjusting the candidate weights iteratively to minimize the cost output to thereby arrive at an optimized set of weights.

2. The method of claim 1, wherein the optimization procedure is performed in advance of obtaining the first projection data;

wherein the optimization procedure comprises a step of storing the optimized set of weights in a weight database; and wherein the transforming the first projection data into the second projection data comprises accessing the weight database to retrieve the optimized set of weights and using the optimized set of weights to define the two or more synthetic energy channels of the second projection dataset.

3. The method of claim 2, wherein the weight database stores a plurality of predetermined sets of weights for the three of more measured energy channels, each for defining a respective set of synthetic energy channels, and each derived by applying a respective instance of the optimization procedure; and wherein the transforming the first projection data into the second projection data comprises accessing the weight database, selecting one of the plurality of sets of weights and using the selected set of weights to define the two or more synthetic energy channels of the second projection dataset.

4. The method of claim 3, wherein each set of weights in the database is optimized for application in a defined imaging scenario, and wherein the selecting from the database is performed based on querying the database with a target imaging scenario to be performed.

5. The method of claim 1, wherein the error estimator model is further configured to generate as output a predicted bias of outputs of the pre-defined material decomposition algorithm if applied to the data comprising the candidate synthetic energy channels, and wherein the cost function is applied to the predicted bias and a cost output from the cost function is correlated with a predicted measure of bias of the outputs of the material decomposition algorithm.

6. The method of claim 1, wherein the determining the covariance matrix comprises applying a Cramer-Rao Lower Bound (CRLB) method.

7. The method of claim 1, wherein the method further comprises applying the material decomposition algorithm to the second projection data.

8. The method of claim 1, wherein the optimization procedure comprises selecting a cost function from a predefined set of two or more cost functions, wherein a cost output from each cost function is representative of a different respective measure of error for the outputs of the material decomposition algorithm.

9. The method of claim 1, wherein the first projection data and second projection data are photon count projection data.

10. A system for data reduction of multi-energy computed tomography (CT) projection data, comprising:

a memory that stores a plurality of instructions; and a processor assembly coupled to the memory and configured to execute the plurality of instructions to:

obtain first CT projection data comprising data for each of a set of three or more measured x-ray energy channels;

transform the first projection data into second projection data, wherein the second projection data comprises data for a set of two or more synthetic energy channels, each formed as a weighted combination of the measured energy channels, wherein the number of synthetic energy channels is less than the number of measured energy channels;

wherein weights of said weighted combination forming each synthetic energy channel are determined in an optimization procedure which comprises:

applying an error estimator model configured to receive as input a candidate set of synthetic energy channels formed according to a candidate set of weights for the weighted combination, and to generate as output a predicted covariance matrix of outputs of a predefined material decomposition algorithm;

applying a pre-defined cost function to the covariance matrix, wherein a cost output from the cost function is correlated with a predicted measure of error for the outputs of the material decomposition algorithm; and adjusting the candidate weights iteratively to minimize the cost output to thereby arrive at an optimized set of weights.

11. The system of claim 10, further comprising a photon counting x-ray detector for acquiring spectral photon count CT data.

12. A non-transitory computer-readable medium for storing executable instructions, which cause a method for data reduction of multi-energy computed tomography (CT) projection data to be performed, the method comprising:

obtaining first CT projection data comprising data for each of a set of three or more measured x-ray energy channels;

transforming the first projection data into second projection data, wherein the second projection data comprises data for a set of two or more synthetic energy channels, each formed as a weighted combination of the measured energy channels, wherein the number of synthetic energy channels is less than the number of measured energy channels;

wherein weights of said weighted combination forming each synthetic energy channel are determined in an optimization procedure which comprises:

applying an error estimator model configured to receive as input a candidate set of synthetic energy channels formed according to a candidate set of weights for the weighted combination, and to generate as output a predicted covariance matrix of outputs of a predefined material decomposition algorithm;

applying a pre-defined cost function to the covariance matrix, wherein a cost output from the cost function is correlated with a predicted measure of error for the outputs of the material decomposition algorithm; and adjusting the candidate weights iteratively to minimize the cost output to thereby arrive at an optimized set of weights.

* * * * *